April 21, 1936.　　　A. O. LONG　　　2,038,050
IRONING MACHINE
Filed Aug. 20, 1934　　　2 Sheets-Sheet 1

INVENTOR
Archie O. Long.
BY
ATTORNEY

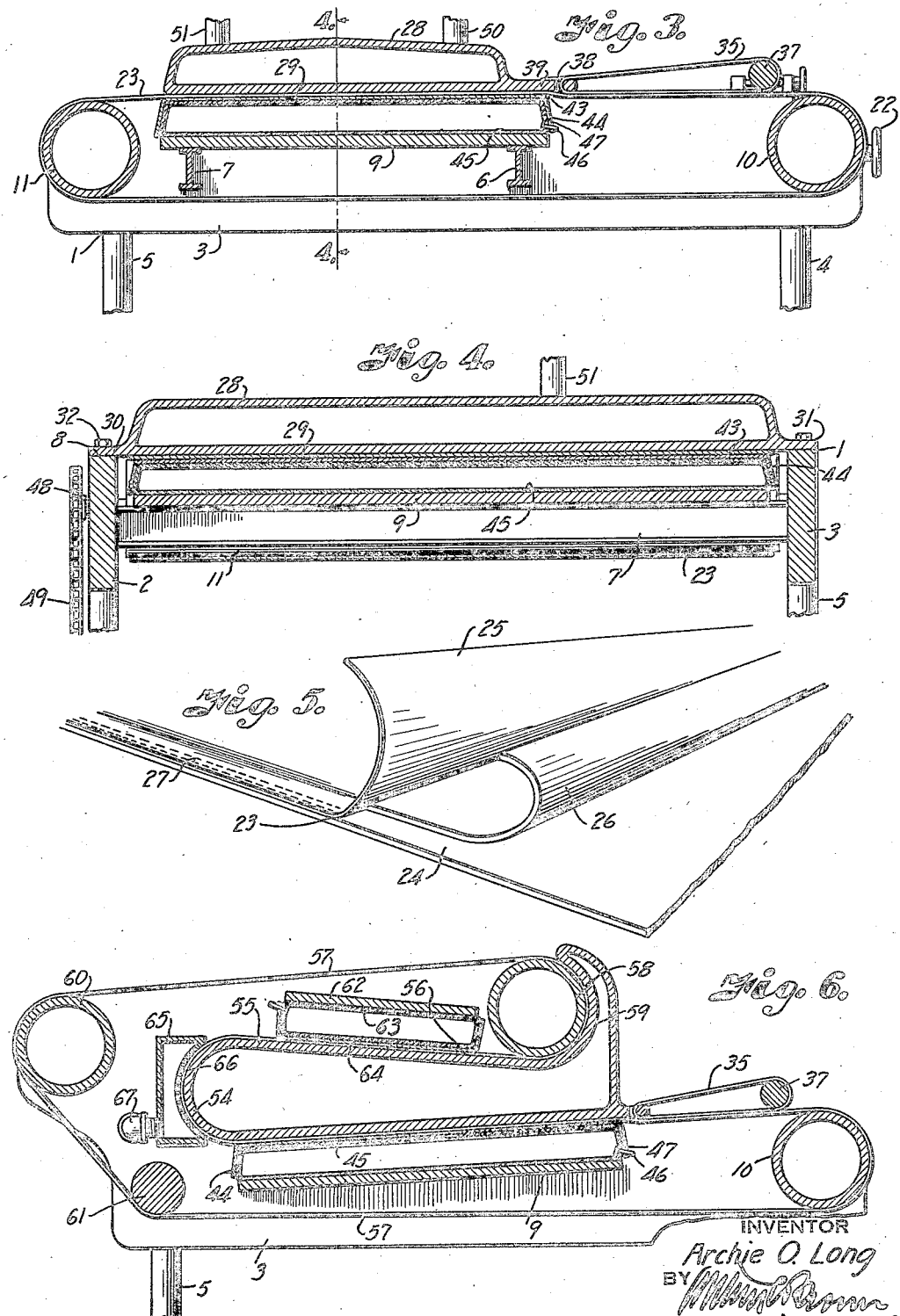

Patented Apr. 21, 1936

2,038,050

UNITED STATES PATENT OFFICE 2,038,050

IRONING MACHINE

Archie O. Long, Kansas City, Mo.

Application August 20, 1934, Serial No. 740,581

6 Claims. (Cl. 68—9)

This invention relates to ironing machines and more particularly to those of that character for use in ironing flat work and has for its principal object to provide a simple, inexpensive ironer construction which is self adjustable to the thickness of flat pieces run through the machine.

Other important objects of the invention are to provide uniform pressure over the entire area of the ironing surface and to provide for selectively varying the pressure of the flat work against the ironing surface.

In accomplishing these and other objects of the invention, I have provided improved details of structure, the preferred forms of which are illustrated in the accompanying drawings, wherein:

Fig. 3 is a longitudinal vertical section through the ironer.

Fig. 4 is a cross section through the ironer on the line 4—4, Fig. 3.

Fig. 5 is a detail perspective view illustrating the conveyor construction.

Fig. 6 is a longitudinal section through a modified form of ironer.

Figure 1:
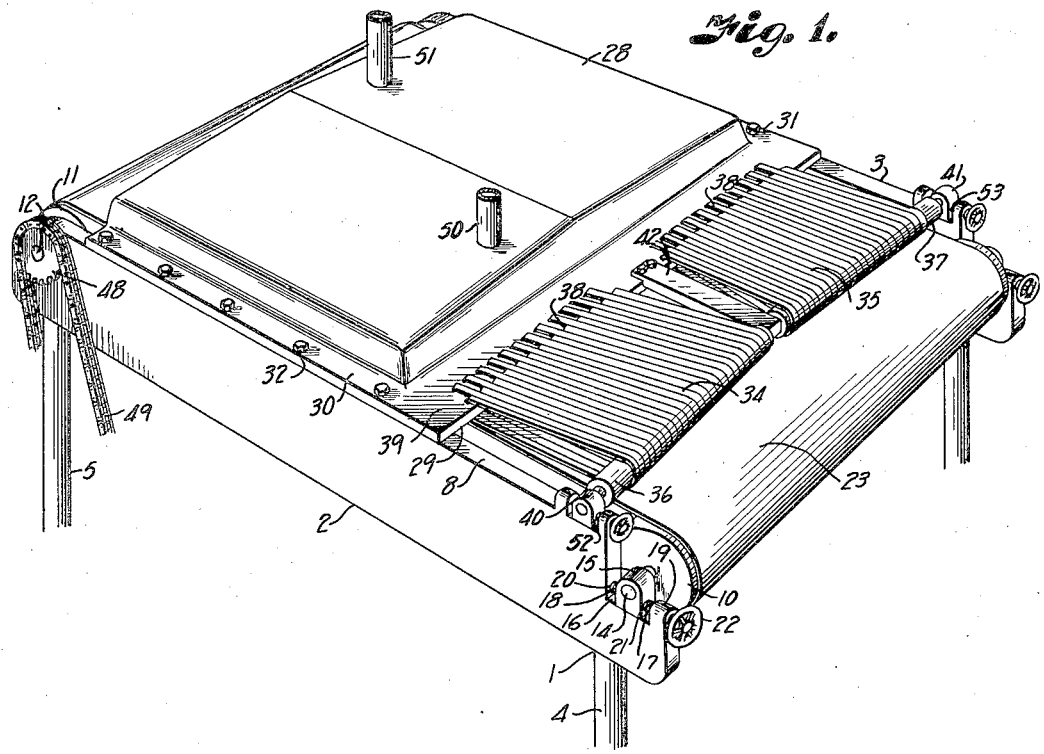
Fig. 1 is a perspective view of a flat work ironer constructed in accordance with the present invention.

Referring more in detail to the drawings:

The ironer includes a supporting frame 1 comprising longitudinal side members 2 and 3 supported at their ends by pairs of legs 4 and 5 and spaced apart by cross beams 6 and 7. The cross beams 6 and 7 are spaced below the upper edge 8 of the side members adjacent one end of the supporting frame and carry a horizontal platform 9 extending between the side members and having its front and rear edges spaced from the ends of the side members to accommodate rollers 10 and 11.

The roller 11 has fixed mounting on the frame and carries trunnions 12 rotatably mounted in bearing openings 13 in the side members. The roller 10 is adjustably mounted on the frame and has trunnions 14 rotatably mounted in bearings 15 that are slidably mounted in recesses 16 formed in the ends of the side members, the bearings being actuated by adjusting screws 17.

The screws 17 comprise threaded shafts 18 having their ends rotatably mounted in lugs 19 on the side members and in aligning sockets 20 at the sides of the recesses opposite the lugs, the shafts extending through threaded openings 21 in the bearings 15. The outer ends of the screws project beyond the lugs and carry hand wheels 22 for rotating the shafts in selectively positioning the bearings in the recesses to vary tension of an endless conveyor belt 23 operating over the respective rollers.

The conveyor belt 23 extends across the entire width of the supporting frame between the side members 2 and 3 and includes an endless flexible sheet 24 contacting the rollers, an outer flexible sheet 25, and an interposed padding sheet 26, the side edges of the sheets 24 and 25 being secured together by stitching or the like as at 27 to retain the padding sheet as best illustrated in Fig. 5.

Supported by the upper edges of the side members directly over the horizontal platform 9 is a heater 28 comprising a hollow member having a flat ironing face 29 located in contact with the upper face of the conveyor belt, as shown in Fig. 3. The heater is provided with laterally extending side flanges 30 and 31 which are secured to the side members by fastening devices 32 extending through the flanges and into threaded openings 33 in the side frames, thereby securing the ironing face over the upper run of the conveyor belt. The heater terminates short of the roller 10 to expose a portion of the conveyor so that the flat work pieces can be spread thereover before they pass under the ironing surface.

In order to provide automatic means for spreading out the flat work pieces before they are delievered under the ironing head, the exposed portion of the belt is super-imposed with sets of belts 34 and 35 so positioned that one set lies on one side of the longitudinal center line of the conveyor belt and the other set on the opposite side with the belts travelling in diverging relation to the center line of the conveyor.

The sets of belts 34 and 35 are operable over angularly arranged rollers 36 and 37 and through slotted openings 38 in a flange 39 projecting forwardly from the heater and extending transversely across the width thereof as clearly shown in Fig. 1.

The rollers 36 and 37 have their outer ends rotatably mounted in bearings 40 and 41 respectively and their inner ends rotatably mounted in the end of a bearing bracket 42 that is secured to the flange 39 in the longitudinal center of the machine. The bearings in the bracket arm 42 are located forwardly of the bearings 40 and 41 to position the axes of the rollers at right angles to the runs of the belts 34 and 35. The slotted openings 38 are arranged in staggered and parallel relation with the axes of the rollers and the forward side edges of the slots form surfaces over which the belts are moved because of the driving relation of the lower runs of the belts with the upper run of the conveyor.

With the construction thus far described, it is apparent that when a piece of flat work is applied on the conveyor belt at the forward end thereof to pass under the rollers 36 and 37, the belts 34 and 35 will exert outward tension on the sides of the work piece to spread it tautly across the width of the belt, thereby removing wrinkles or any folds not removed by the operator.

Upon passing the stretching belts, the work pieces enter under the ironing surface of the heater and are delivered off the end of the conveyor belt across the roller 11. However, in order to effectively iron the work pieces, pressure must be applied to the under face of the upper run of the conveyor and this is accomplished by a shoe 43 comprising a flat plate contacting the under face of the belt and conforming in shape to that of the ironing surface which contacts the upper face of the belt.

Figure 2:
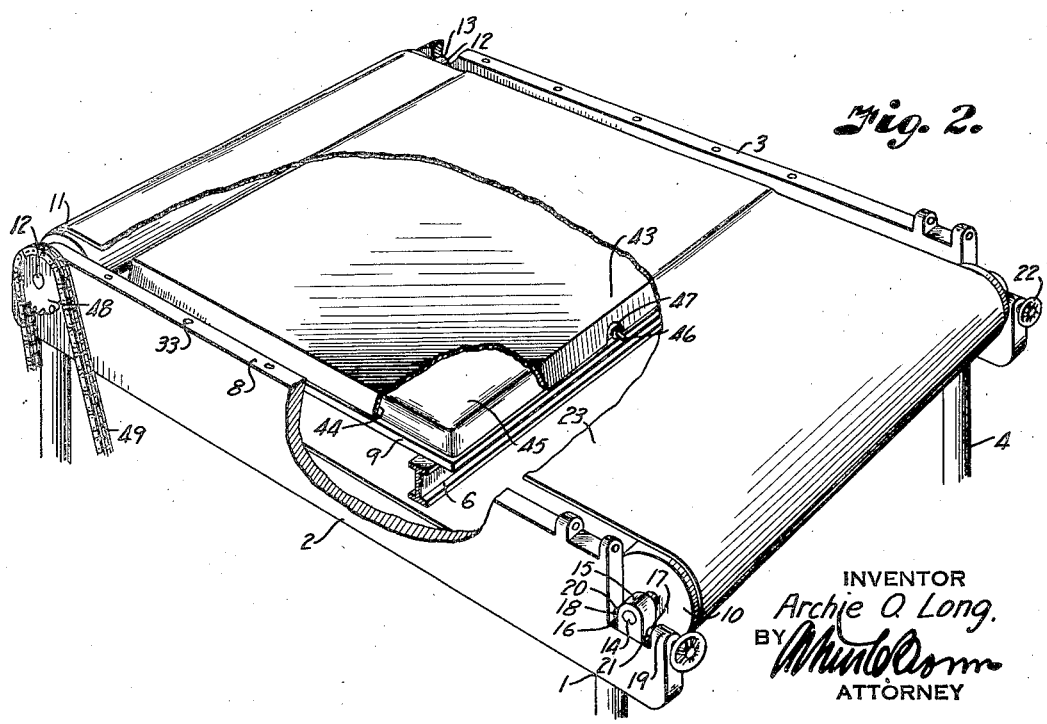
Fig. 2 is a perspective view with the heater and work straightening mechanism removed to better illustrate the flat work conveyor, a part of which is broken away to show pressure exerting means.

The edges of the plate 43 are flanged downwardly as at 44 toward the platform 9 to cooperate therewith in housing an inflatable bag 45 which supports the shoe. The bag 45 is formed of elastic material so that the size thereof will be varied according to the pressure contained within the bag. Since the lower side of the bag is supported on the platform 9 and the sides are confined by the flanges, the upper side will exert pressure on the shoe 43 and hold the upper run of the belt carrying the work pieces in ironing relation to the ironing surface. The pressure at which the belt is retained against the heater is, of course, variable according to the pressure contained in the bag, which pressure is established by pumping air or other compressible fluid into the bag through a valve fitting 46 extending through a notched opening 47 in one of the flanges 44, as best shown in Fig. 2.

Due to the fact that increased pressure is applied to one side of the bag, incidental to a work piece moving under the ironing surface, a similar increase in pressure will be imparted to all parts of the bag, thereby maintaining uniform pressure over the entire ironing surface.

In order to drive the conveyor belt, one of the trunnions for the roller 11 is provided with a sprocket 48 which is operated by a chain 49 from any suitable power source, not shown.

A suitable heating medium such as steam is delivered to the interior of the heater 28 through an inlet pipe 50 and the condensate is passed therefrom through an outlet pipe 51, shown in Figs. 1 and 3.

In order to regulate the stretching influence of the sets of belts 34 and 35, the bearings carrying the outer ends of the rollers 36 and 37 are adjustably mounted on the frame members 2 and 3 by means of hand operated screws 52 and 53 of substantially the same construction and in the same manner as the screws 17 previously described by adjusting tension of the delivery belt.

In operating a machine constructed and assembled as described, flat pieces to be ironed are applied to the upper run of the conveyor belt directly over the roller 10 so that the forward movement of the belt will carry the flat pieces under the stretching belts 34 and 35 which, due to their angular travel relatively to the travel of the main conveyor belt, stretches out any wrinkles that may be present in the pieces of flat work before they are delivered under the ironing surface of the heater.

When the flat pieces are travelling under the heater the shoe 43 presses against the upper run of the conveyor and holds the work pieces tightly against the ironing surfaces while they are being moved by the belt so as to obtain substantially the same ironing effect as where an iron is moved over the work in the hand ironing of flat work.

If desired, greater pressure may be applied by injecting more air into the bag which causes a greater pressure to act upon the conveyor belt or, if desired, the pressure may be reduced simply by letting out some of the air that is in the bag.

Due to the yieldability of the shoe 42, by reason of its support by the bag 45, the shoe readily accommodates itself to work pieces of different thickness so that regardless of the thickness of the material being moved through the ironer, substantially the same pressure is exerted to hold the pieces against the ironing surface.

In Fig. 6 is illustrated a modified form of the invention wherein the rear of the heater is rounded as at 54 and cooperates with the upper portion 55 thereof to form an extended ironing surface 56 and the conveyor belt 57 operates over the rounded side of the heater to divert the work pieces upwardly and retractively over the upper ironing surface 55 to the front of the heater where the belt passes over a roller 57. The roller 58 retains the work in contact with a concave ironing shoe portion 59 of the heater to cause the work to be carried onto the upper run of the conveyor belt 56 which also operates over rollers 60 and 61.

In order to retain the work pieces against the upper ironing surface 56, the belt is supported in contact therewith by a shoe 62 carrying an inflatable bag 63 bearing against a suitable plate 64.

In order to withdraw moisture from the belt and work carried thereby I provide a vacuum shoe 65 having a perforated concave surface 66 engaging the belt at the point where it rounds the portion 54 of the heater, the vacuum being applied through a pipe 67 so that the moisture is drawn through the apertures and into the shoe 65.

From the foregoing, it is apparent that I have provided an ironer which is of simple and relatively inexpensive construction and which is self adjustable to the thickness of the flat pieces run through the machine.

It is also apparent that the pressure applied to the work may be varied by correspondingly varying the pressure of the fluid contained in the bag which supports the upper run of the conveyor.

What I claim and desire to secure by Letters Patent is:

1. In a device of the character described, a support, an ironing member on the support, spaced rollers on the support, an endless belt operating over the rollers and having a run thereof moving across the ironing member to convey work pieces in contact therewith, an inverted pan shaped shoe engaging the run of the belt, an inflated bag mounted within and supporting the shoe, and a platform on the support for carrying the bag.

2. In a device of the character described, a support, an endless conveyor belt operable on the support, a heater having an ironing surface in cooperative relation with the conveyor belt, means rigidly mounting the heater on the support with the ironing surface in fixed contact with one of the runs of the conveyor belt, a shoe engaging the opposite side of said run and having a contact surface substantially coextensive with the ironing surface, and an inflatable bag carried by the support and engaging said shoe to retain the conveyor belt in yielding contact with the ironing surface.

3. In a device of the character described, a heating chamber having an ironing surface, means for conveying articles across said ironing surface, a pan shaped shoe for engaging said conveying means, an inflated bag within the shoe, and means supporting the inflated bag in thrusting relation with said shoe for effecting application of pressure against the articles as they are moved across said ironing surface by the conveying means.

4. In a device of the character described, a heating chamber having ironing surfaces on opposite sides thereof, a conveyor belt having runs operating over said surfaces, pan shaped shoes conforming to the ironing surfaces, inflated bags mounted within said shoes, and means supporting the inflated bags in thrusting relation with said shoes for yieldingly retaining the shoes in pressing contact with the runs of the conveyor belt.

5. In a device of the character described, a frame including side members, a horizontal member extending between the side members, a conveyor belt carried by the frame and having a run operating in spaced relation with said horizontal member, means having an ironing surface contacting said run of the conveyor belt, a shoe engaging the opposite side of said run, and an inflated bag engaging between the shoe and said horizontal member to urge the belt in pressing contact with said ironing surface.

6. In a device of the character described, a frame including side members, horizontal members extending between the side members, an endless conveyor belt carried by the frame and having runs operating in spaced relation with said horizontal members, means having ironing surfaces contacting said runs of the conveyor belt on the faces of the runs opposite said horizontal members, shoes engaging the other faces of said runs, and inflated bags engaging between the shoes and said horizontal members to urge the belt in pressing contact with said ironing surfaces.

ARCHIE O. LONG.